US008861002B2

(12) United States Patent
Iizuka

(10) Patent No.: US 8,861,002 B2
(45) Date of Patent: Oct. 14, 2014

(54) IMAGE FORMING APPARATUS, CONTROL METHOD THEREFOR, AND STORAGE MEDIUM

(71) Applicant: Canon Kabushiki Kaisha, Tokyo (JP)

(72) Inventor: Hiroko Iizuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/747,209

(22) Filed: Jan. 22, 2013

(65) Prior Publication Data

US 2013/0215459 A1 Aug. 22, 2013

(30) Foreign Application Priority Data

Feb. 21, 2012 (JP) ................................ 2012-035468

(51) Int. Cl.

| | |
|---|---|
| ***G06F 3/12*** | (2006.01) |
| ***G06K 15/02*** | (2006.01) |
| ***H04N 1/00*** | (2006.01) |
| ***G06K 15/00*** | (2006.01) |

(52) U.S. Cl.

CPC .......... *G06K 15/007* (2013.01); *G06K 15/1821* (2013.01); *H04N 1/00* (2013.01); *G06F 3/1228* (2013.01); *G06F 3/1253* (2013.01); *G06F 3/1205* (2013.01); *G06F 3/1287* (2013.01); *G06K 15/1803* (2013.01)

USPC ......... 358/1.15; 358/1.14; 709/206; 709/217; 709/219

(58) Field of Classification Search

CPC .................... G06F 17/30864; G06F 17/30011; G06F 17/30345; G06K 15/007; G06K 15/1803; G06K 15/1806; G06K 15/1821

USPC ................. 358/1.15, 1.14; 709/206, 217, 219

See application file for complete search history.

(56) References Cited

U.S. PATENT DOCUMENTS

2005/0168772 A1* 8/2005 Kim ............................ 358/1.15
2012/0154854 A1* 6/2012 Sato ............................ 358/1.15

FOREIGN PATENT DOCUMENTS

JP 2000-10922 1/2000

* cited by examiner

*Primary Examiner* — Jacky X Zheng

(74) *Attorney, Agent, or Firm* — Fitzpatrick, Cella, Harper & Scinto

(57) ABSTRACT

An image forming apparatus registers a message using a microblogging function in a Web server. When the image forming apparatus confirms a comment to the registered message, it analyzes the comment and converts it into control information for executing processing by the image forming apparatus. The image forming apparatus generates an analysis result comment for confirming whether or not the analysis result is correct, and registers the analysis result comment in the Web server. When a comment of the user to the registered analysis result comment is affirmative, processing in accordance with the control information is executed.

10 Claims, 11 Drawing Sheets

F I G. 3
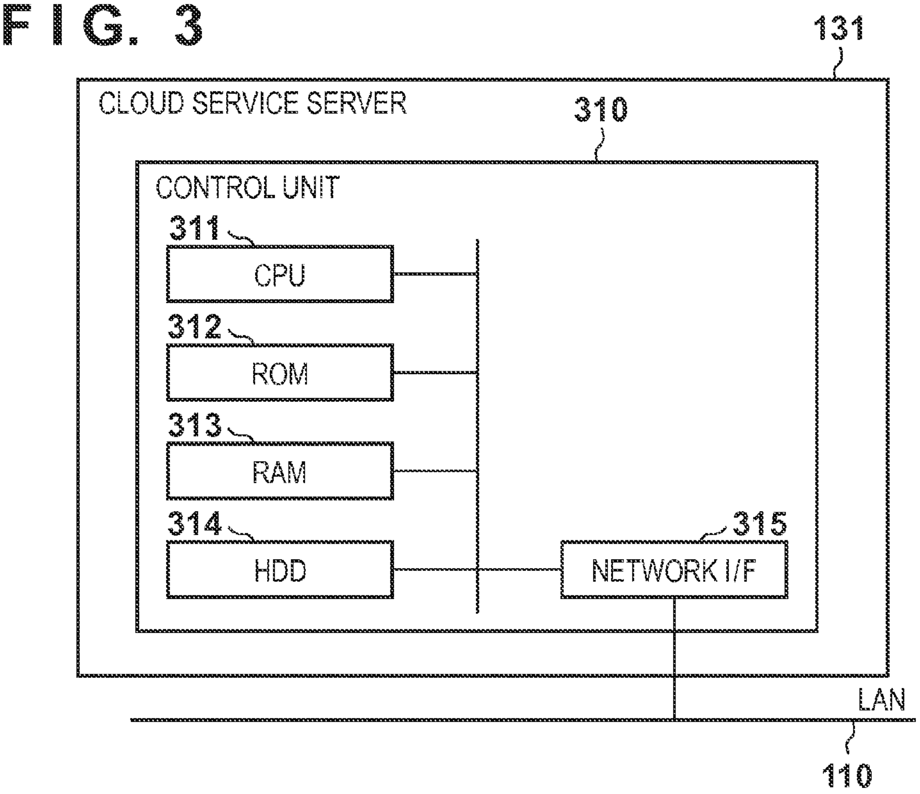
F I G. 4
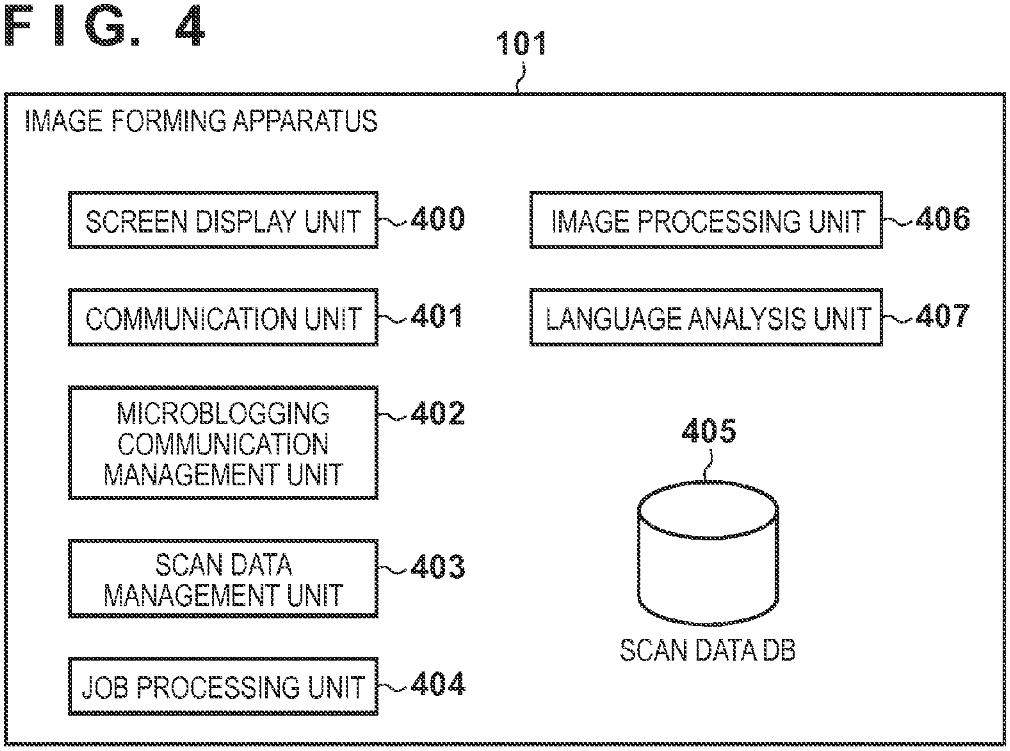

F I G. 9
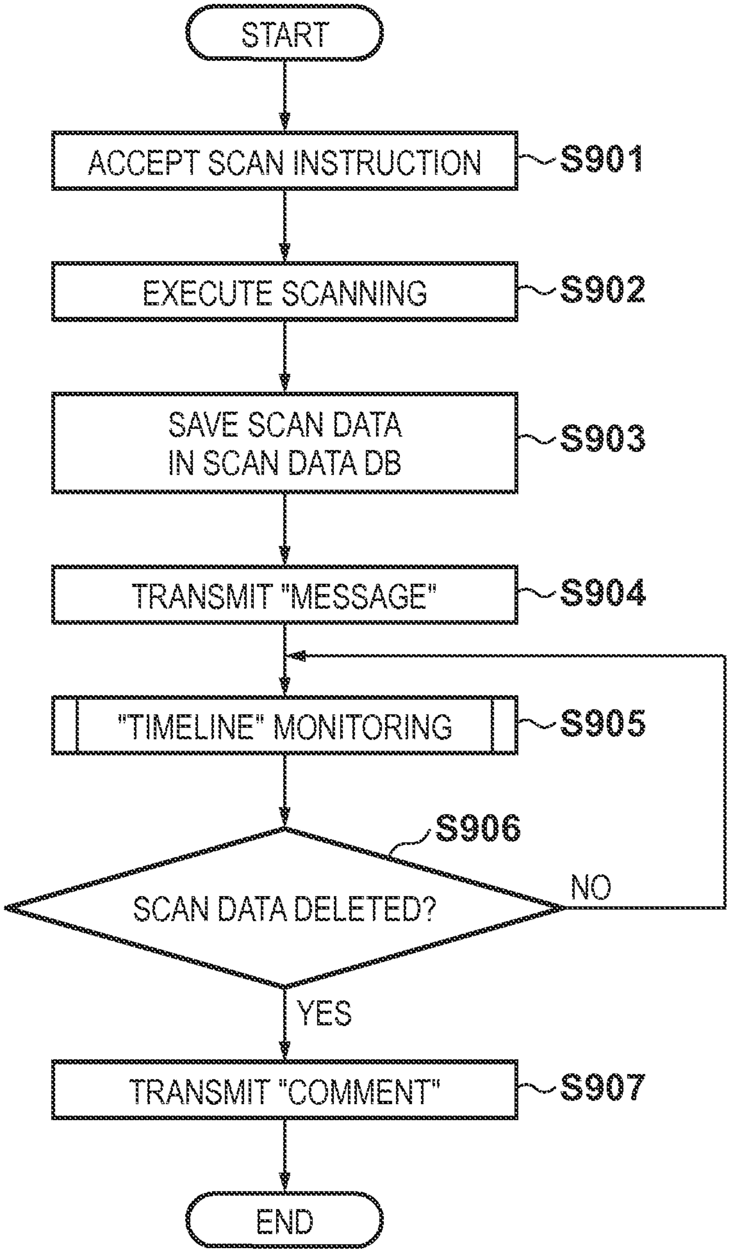

FIG. 12

| SCAN DOCUMENT ID | SCAN DOCUMENT NAME | MESSAGE ID |
|---|---|---|
| 0001 | AA CONFERENCE MINUTES | 147051 |
| 0002 | AA CONFERENCE HANDOUT | 825089 |
| 0003 | BB PROJECT SCHEDULE | 344583 |
| 0004 | CC APPLICATION | 439097 |

| COMMAND CHARACTER STRING | PROCESSING FUNCTION |
|---|---|
| send | TRANSMISSION FUNCTION |
| print | PRINT FUNCTION |

1310

1311 1312

| PROTOCOL CHARACTER STRING | PROCESSING FUNCTION |
|---|---|
| me | MAIL TRANSMISSION FUNCTION |
| email | MAIL TRANSMISSION FUNCTION |
| e-mail | MAIL TRANSMISSION FUNCTION |
| mail | MAIL TRANSMISSION FUNCTION |
| document | STORAGE FUNCTION TO CLOUD SERVICE SERVER |

1320

1321 1322

| PARAMETER CHARACTER STRING | PROCESSING FUNCTION |
|---|---|
| pdf | PDF CONVERSION PROCESSING |
| xps | XPS CONVERSION PROCESSING |
| jpeg | JPEG CONVERSION PROCESSING |

IMAGE FORMING APPARATUS, CONTROL METHOD THEREFOR, AND STORAGE MEDIUM

BACKGROUND OF THE INVENTION

1. Field of the Invention

The present invention relates to a method for controlling an image forming apparatus which is connected to a server configured to provide services via a network, and uses a microblogging function provided by the server, and a storage medium.

2. Description of the Related Art

Recently, a cloud computing system has come into practical use as a system form which provides services using the Internet. The user can use a service provided by a cloud computing system, called a cloud service, if he prepares a minimum connection environment without preparing a hardware resource such as a server. An example of already implemented cloud services is a CRM (Customer Relationship Management) service which provides the function of a CRM system for customer management and sales support. Another cloud service is a document management service which provides storage and management functions for saving and managing electronic files.

There is a service which provides a microblogging function as a communication tool. The microblogging function is a short blogging function which allows a user having an account for the service to release a short text of about 100 to 200 characters, called "tweet", as "message" or "comment". This user includes objects, applications, and the like on cloud services such as a printer and cooperative service, and is not limited to an existent user (human). A unique identifier is assigned to each "message" or "comment" released by a user. The microblogging function creates a "timeline" on which when a user registers "message", a list of "comments" related to the registered "message" can be registered, displayed, and managed. The user who has registered the "message", and other users exchange information by registering related information as "comments" on the "timeline", and communicate with each other. Each user account has a function of managing the profile of a user, and reveals who is the communication partner. For example, information about the user's name, contact address (for example, mail address, telephone number, and address), and group to which he belongs is managed.

Some CRM services provided as cloud services provide even the microblogging function as a communication tool when performing business. These cloud services link customer information and business talk information with "messages" and "comments", further improving user friendliness. At the same time, some CRM services provide a file sharing function of sharing a file between users, and saving, editing, updating, and referring to the file. An example is Salesforce.com, and the microblogging function provided is "Chatter". The file sharing function corresponds to "Document" and "File".

Image forming apparatuses are advancing in function and becoming multifunctional. Recently, image forming apparatuses equipped with not only basic functions of digitizing and printing a paper document, such as the scan function and print function, but also a network interface (to be simply referred to as a network I/F hereinafter) have been developed. The image forming apparatus equipped with the network I/F provides various solutions in cooperation with an external system and external service connected via a network. For example, the image forming apparatus equipped with the network I/F can transmit, to a cloud document management service, an electronic file generated by scanning a paper document, and save it. The image forming apparatus can also transmit an electronic file to a partner by mail attachment or the like.

Japanese Patent Laid-Open No. 2000-10922 proposes a technique for executing processing by a server based on an instruction from a client. More specifically, the client terminal transmits, to an FTP folder, a file describing an execution command. The server detects the transmission of the file from the client terminal, and executes a job by executing a command described in the file.

However, the conventional technique has the following problem. For example, assume that, in an environment where business is performed using the microblogging function provided by a cloud service, the user issues a processing instruction in a natural language to an image forming apparatus by using the microblogging function. In this case, it cannot be confirmed whether or not the result of analyzing the natural language by the image forming apparatus matches the processing instruction contents the user intends. Processing the user intends may not be executed, and for example, an output material from the image forming apparatus may go to waste.

SUMMARY OF THE INVENTION

The present invention enables realization of an image forming apparatus which, when the user issues a processing instruction by using the microblogging function provided by a cloud service, presents, to him, the result of analyzing the processing instruction, and confirms whether or not the analysis is correct, a control method therefor, and a storage medium.

One aspect of the present invention provides an image forming apparatus capable of communicating with a Web server having a microblogging function, comprising: a registration unit configured to register a message using the microblogging function in the Web server; a monitoring unit configured to monitor a comment to the message registered by the registration unit; an acquisition unit configured to, when the monitoring unit confirms the comment to the registered message, acquire, from the Web server, the comment and user information about a user who has transmitted the comment; an analysis unit configured to analyze the comment acquired by the acquisition unit, and convert the comment into control information for executing processing by the image forming apparatus; a generation unit configured to generate an analysis result comment indicating the control information converted by the analysis unit, the analysis result comment prompting the user corresponding to the user information acquired by the acquisition unit to confirm whether or not an analysis result by the analysis unit is correct; a determination unit configured to register, as a response to the acquired comment in the Web server by using the registration unit, the analysis result comment generated by the generation unit, and determine whether or not a comment of the user to the registered analysis result comment is affirmative; and a processing unit configured to, when the determination unit determines that the comment to the analysis result comment is negative, execute no processing in accordance with the control information, and when the determination unit determines that the comment to the analysis result comment is affirmative, execute processing in accordance with the control information.

Another aspect of the present invention provides a method for controlling an image forming apparatus capable of communicating with a Web server having a microblogging function, comprising: causing a registration unit to register a message using the microblogging function in the Web server;

causing a monitoring unit to monitor a comment to the message registered in the causing the registration unit to register a message; causing an acquisition unit to, when the comment to the registered message is confirmed in the causing the monitoring unit to monitor a comment, acquire, from the Web server, the comment and user information about a user who has transmitted the comment; causing an analysis unit to analyze the comment acquired in the causing the acquisition unit to acquire the comment and user information, and convert the comment into control information for executing processing by the image forming apparatus; causing a generation unit to generate an analysis result comment indicating the control information converted in the causing the analysis unit to analyze the comment, the analysis result comment prompting the user corresponding to the user information acquired in the causing the acquisition unit to acquire the comment and user information, to confirm whether or not an analysis result in the causing the analysis unit to analyze the comment is correct; causing a determination unit to register, as a response to the acquired comment in the Web server in the causing the registration unit to register a message, the analysis result comment generated in the causing the generation unit to generate an analysis result comment, and determine whether or not a comment of the user to the registered analysis result comment is affirmative; and causing a processing unit to, when the comment to the analysis result comment is determined to be negative in the causing the determination unit to register the analysis result comment, execute no processing in accordance with the control information, and when the comment to the analysis result comment is determined to be affirmative in the causing the determination unit to register the analysis result comment, execute processing in accordance with the control information.

Further features of the present invention will be apparent from the following description of exemplary embodiments with reference to the attached drawings.

BRIEF DESCRIPTION OF THE DRAWINGS

FIG. 3 is a block diagram showing the hardware configuration of a cloud service server 131 according to the embodiment;

FIG. 4 is a block diagram showing the software configuration of the image forming apparatus 101 according to the embodiment;

FIG. 9 is a flowchart for explaining overall processing from an image reading operation up to message transmission and comment monitoring in the image forming apparatus 101 according to the embodiment;

FIG. 12 is a table showing a scan data management table in the image forming apparatus 101 according to the embodiment; and FIG. 13 is a view showing a command character string management table, protocol character string management table, and parameter character string management table in the image forming apparatus 101 according to the embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>

<Arrangement of Image Forming System>

Figure 1:
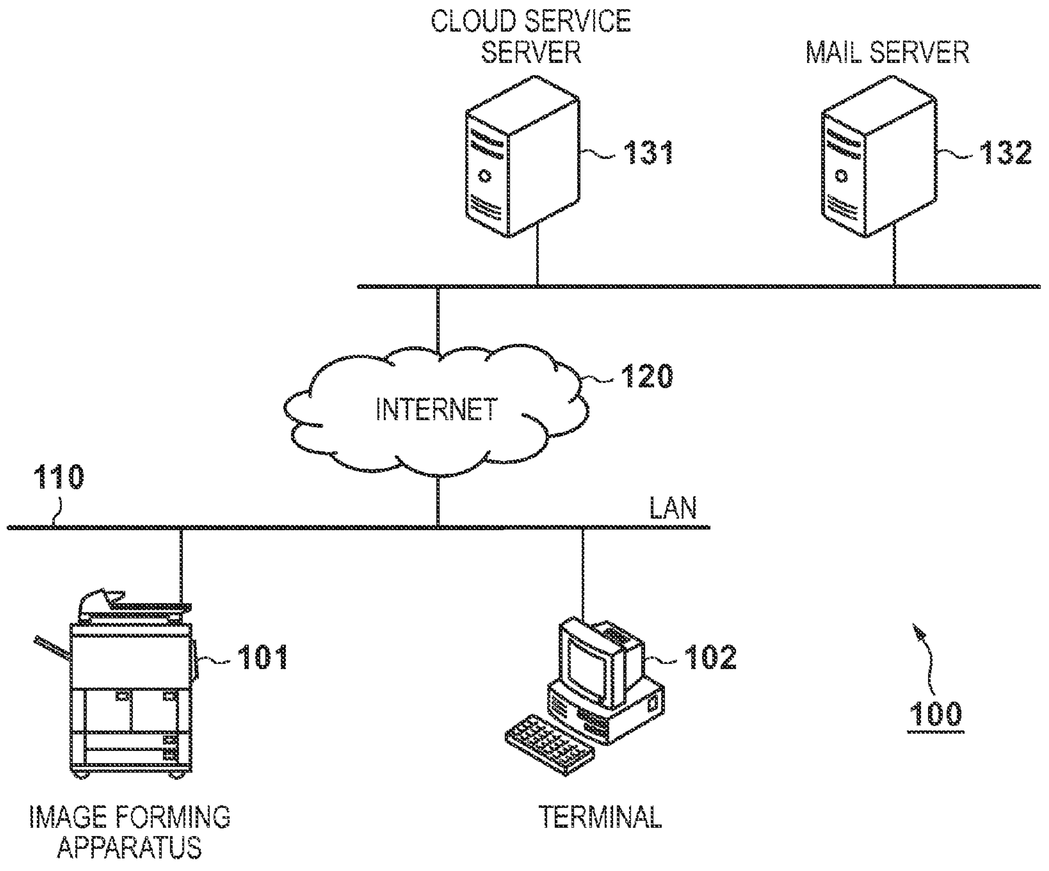
FIG. 1 is a view showing a whole image forming system according to an embodiment.

First, the arrangement of an image forming system 100 in the embodiment will be exemplified with reference to FIG. 1. The image forming system 100 includes an image forming apparatus 101, terminal 102, cloud service server (Web server) 131, and mail server 132. A LAN 110 connects the image forming apparatus 101 and terminal 102 to be able to communicate with each other. The LAN 110 is connected to Internet 120, and connected via the Internet 120 to the cloud service server 131 which provides services. The terminal 102 is connected to the LAN 110, but is not limited to this. The connection form of the terminal 102 is arbitrary as long as the terminal 102 is connectable to the cloud service server 131. Details of each apparatus will be described below.

<Example of Hardware Configuration—Image Forming Apparatus>

Figure 2:
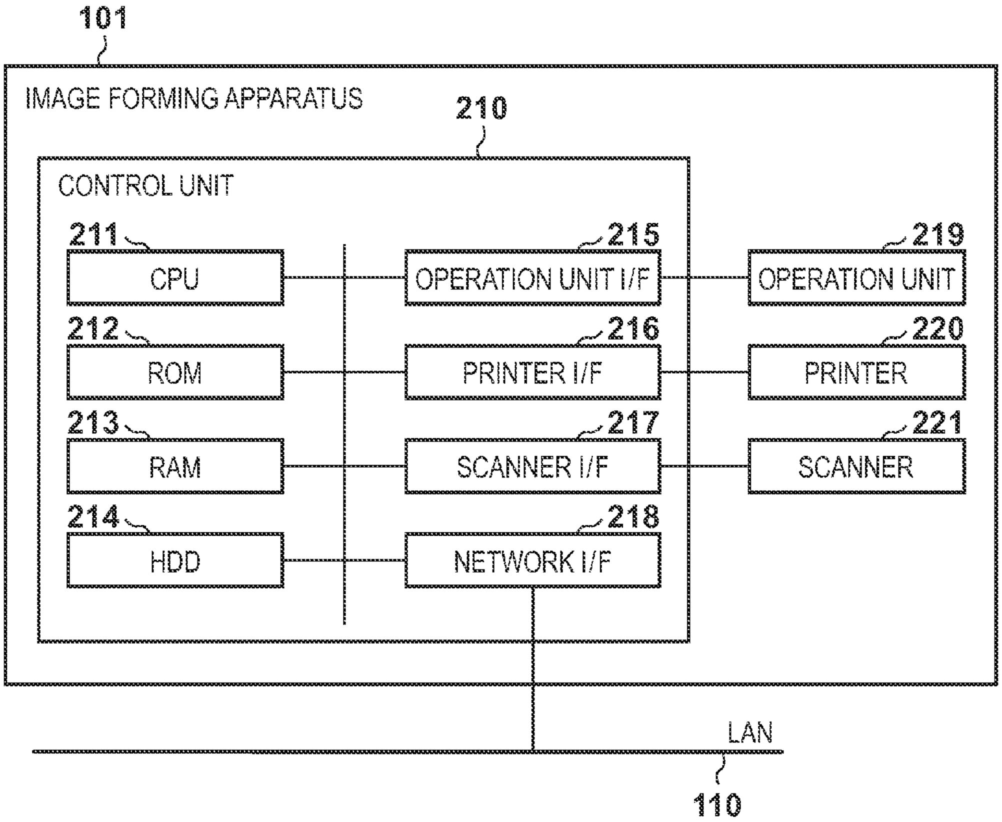
FIG. 2 is a block diagram exemplifying the hardware configuration of an image forming apparatus 101 according to the embodiment.

Next, the hardware configuration of the image forming apparatus 101 will be exemplified with reference to FIG. 2. The image forming apparatus 101 includes a control unit 210, operation unit 219, printer 220, and scanner 221. The control unit 210 includes a CPU 211, ROM 212, RAM 213, HDD 214, operation unit I/F 215, printer I/F 216, scanner I/F 217, and network I/F 218.

The control unit 210 including the CPU 211 performs centralized control of the whole operation of the image forming apparatus 101. The CPU 211 reads out control programs stored in the ROM 212, and performs various control processes such as reading control and transmission control. The RAM 213 is used as a main memory or a temporary storage area such as a work area for the CPU 211.

The HDD 214 stores image data, various programs, or various information tables. The operation unit I/F 215 connects the operation unit 219 and control unit 210. The operation unit 219 includes a liquid crystal display unit having a touch panel function, and a keyboard. The printer I/F 216 connects the printer 220 and control unit 210. Image data to be printed by the printer 220 is transferred from the control unit 210 to the printer 220 via the printer I/F 216, and printed on a printing medium by the printer 220. The scanner I/F 217 connects the scanner 221 and control unit 210. The scanner 221 reads an image on an original to generate image data, and outputs the generated image data to the control unit 210 via the scanner I/F 217.

The network I/F 218 connects the control unit 210 (image forming apparatus 101) to the LAN 110. The network I/F 218 transmits image data and information to an external apparatus (for example, the cloud service server 131 or mail server 132)

on the LAN 110, and receives various kinds of information from the external apparatus on the LAN 110.

<Example of Hardware Configuration—Cloud Service Server, Mail Server, and Terminal>

The hardware configuration of the cloud service server 131 will be exemplified with reference to FIG. 3. The mail server 132 and the terminal 102 serving as an information processing apparatus have the same configuration, and a description thereof will not be repeated. The cloud service server 131 includes a control unit 310. The control unit 310 includes a CPU 311, ROM 312, RAM 313, HDD 314, and network I/F 315.

The control unit 310 including the CPU 311 performs centralized control of the whole operation of the cloud service server 131. The CPU 311 reads out control programs stored in the ROM 312, and performs various control processes. The RAM 313 is used as a main memory or a temporary storage area such as a work area for the CPU 311. The HDD 314 stores image data, various programs, or various information tables (to be described later). The network I/F 315 connects the control unit 310 (cloud service server 131) to the Internet 120. The network I/F 315 transmits/receives various kinds of information to/from another apparatus on the LAN 110.

<Example of Software Configuration—Image Forming Apparatus>

The software configuration of the image forming apparatus 101 will be exemplified with reference to FIG. 4. The image forming apparatus 101 includes a screen display unit 400, communication unit 401, microblogging communication management unit 402, scan data management unit 403, job processing unit 404, scan data database 405, image processing unit 406, and language analysis unit 407. Each functional unit is implemented by executing a control program by the CPU 211 of the image forming apparatus 101. The scan data database 405 will be simply referred to as the scan data DB 405.

The screen display unit 400 displays a screen for executing a scan operation to the operation unit 219, and issues a scan job execution instruction to the job processing unit 404 in accordance with an instruction from the user. The communication unit 401 transmits a request to the cloud service server 131 and mail server 132 in accordance with an instruction from the microblogging communication management unit 402. The communication unit 401 receives responses (replies to the request) from the cloud service server 131 and mail server 132.

When the microblogging communication management unit 402 detects, from a notification from the job processing unit 404, that scan data has been stored in the scan data DB 405, it transmits a message including a text notifying that scan data has been stored in the cloud service server 131. The text notifying that scan data has been stored is a text interpretable by a human, such as “scan data has been prepared”. The microblogging communication management unit 402 manages the transmitted message.

The scan data management unit 403 issues an instruction to store, in the scan data DB 405, scan data generated by the job processing unit 404, and acquires the stored scan data from the scan data DB 405. The job processing unit 404 requests the control unit 210 to execute scan processing in accordance with a scan job execution instruction from the screen display unit 400, and receives image data generated by reading an image on an original by the scanner 221. The job processing unit 404 notifies the scan data management unit 403 that storage of the image data as scan data in the scan data DB 405 has been prepared. In accordance with an instruction from the scan data management unit 403, the scan data DB 405 stores the scan data generated by the job processing unit 404, and acquires the stored scan data to transmit it to the scan data management unit 403.

The image processing unit 406 performs correction, processing, editing, resolution conversion, and the like for input image data. In addition, the image processing unit 406 performs rotation of image data, and compression/decompression processing based on JPEG, MMR, or the like. Also, the image processing unit 406 performs conversion processing into an electronic file format such as PDF, XPS, or OOXML. In response to a request from the microblogging communication management unit 402, the language analysis unit 407 analyzes a message in a natural language that has been received from the cloud service server 131, and converts it into a control language processible by the image forming apparatus 101. To prompt the user to confirm whether or not the analysis result is correct, the language analysis unit 407 describes the analysis result in the natural language, and transmits it to the microblogging communication management unit 402. The natural language is English, Japanese, or the like.

<Example of Software Configuration—Cloud Service Server>

Figure 5:
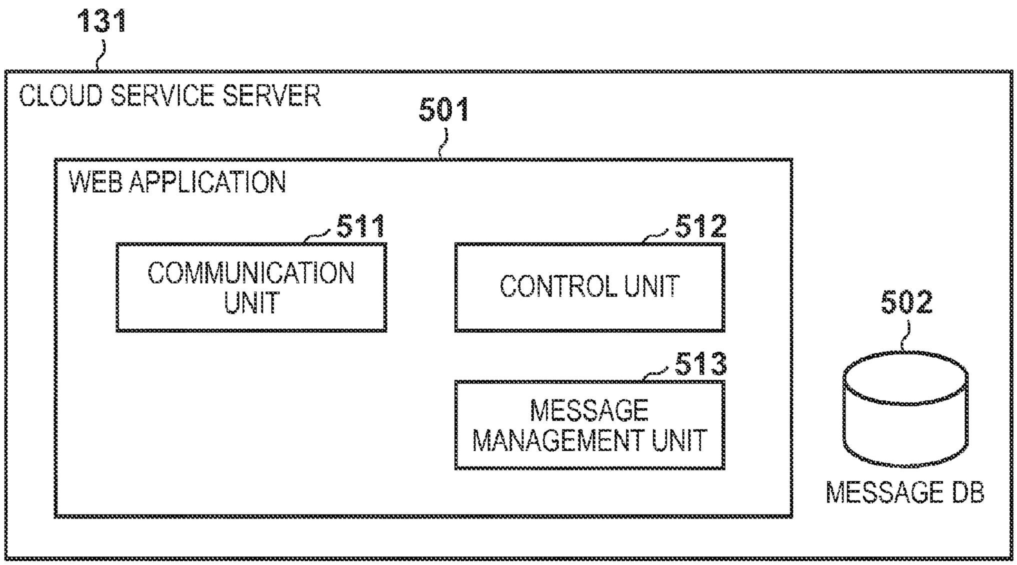
FIG. 5 is a block diagram showing the software configuration of the cloud service server 131 according to the embodiment.

The software configuration of the cloud service server 131 will be exemplified with reference to FIG. 5. The cloud service server 131 includes a Web application 501 and message database (to be simply referred to as a message DB hereafter) 502. The Web application 501 includes a communication unit 511, control unit 512, and message management unit 513. Each functional unit is implemented by executing a control program by the CPU 311 of the cloud service server 131.

The Web application 501 provides the CRM (Customer Relationship Management) service and the like. In the embodiment, the Web application 501 provides the microblogging function.

The communication unit 511 receives requests from the image forming apparatus 101 and the terminal 102 such as a PC, and transmits the request contents to the control unit 512. Further, the communication unit 511 receives a processing result to the request from the control unit 512, creates response data to the request, and transmits the response to the image forming apparatus 101 and terminal 102. The control unit 512 extracts a message or comment contained in the request in accordance with the request contents transmitted from the communication unit 511, and requests the message management unit 513 to register the message or comment.

The message management unit 513 receives the message or comment transmitted from the control unit 512, and stores it in the message DB 502. In response to the request from the control unit 512, the message management unit 513 acquires the registered message or comment from the message DB 502, and transmits it to the control unit 512.

<Example of Software Configuration—Mail Server>

Figure 6:
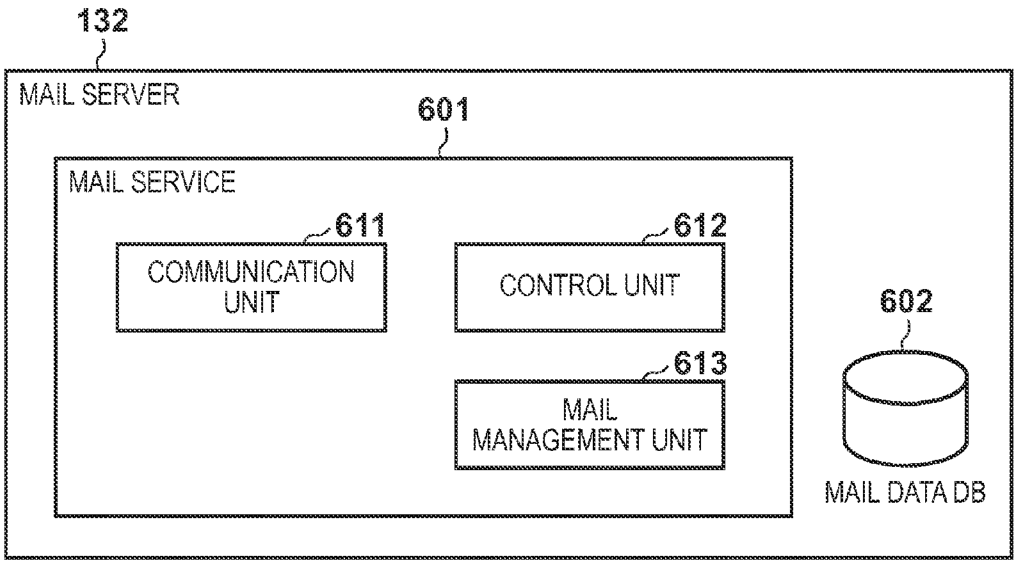
FIG. 6 is a block diagram showing the software configuration of a mail server 132 according to the embodiment.

The software configuration of the mail server 132 will be explained with reference to FIG. 6. The mail server 132 includes a mail service 601 and mail data database (to be referred to as a mail data DB hereinafter) 602. The mail service 601 includes a communication unit 611, control unit 612, and mail management unit 613. Each functional unit is implemented by executing a control program by the CPU 311 of the mail server 132.

The mail service 601 provides mail services based on protocols such as SMTP (Simple Mail Transfer Protocol), POP (Post Office Protocol), and IMAP (Internet Message Access Protocol). The mail service 601 includes the communication unit 611, control unit 612, and mail management unit 613.

The communication unit 611 receives requests from the image forming apparatus 101 and the terminal 102 such as a PC, and transmits the request contents to the control unit 612. Further, the communication unit 611 receives a processing result to the request from the control unit 612, creates response data to the request, and transmits the response to the image forming apparatus 101 and terminal 102.

In accordance with the request contents transmitted from the communication unit 611, the control unit 612 requests, of the mail management unit 613, processes such as storage, deletion, and movement of transmitted mail, and acquisition of a managed mail list. In accordance with the processing request transmitted from the control unit 612, the mail management unit 613 accesses the mail data DB 602 to execute storage, deletion, and movement of transmitted mail, and acquisition of a managed mail list, and transmits the processing result to the control unit 612.

<Microblogging Function>

Figure 7:
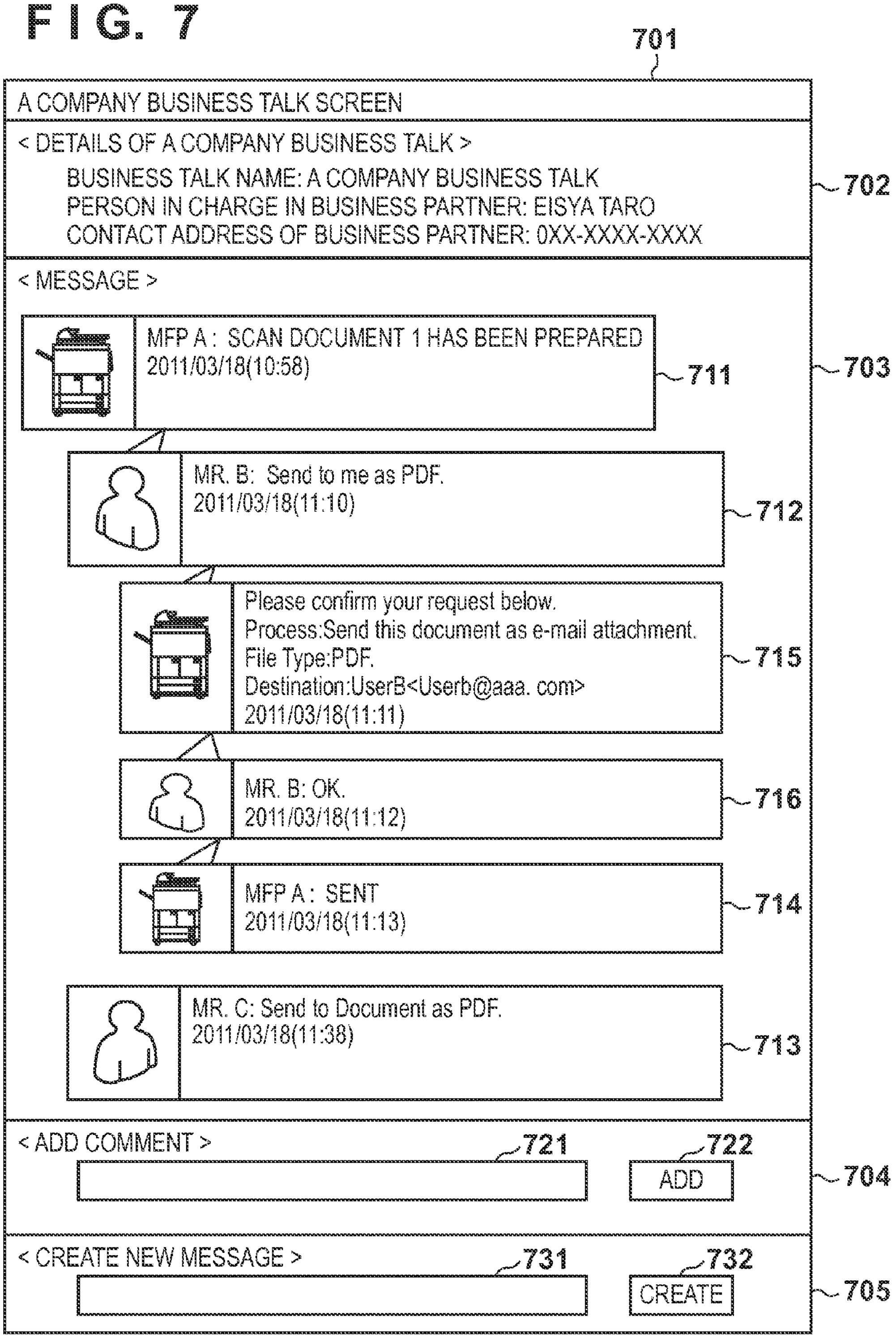
FIG. 7 is a view for explaining a microblogging function according to the embodiment.

The microblogging function provided by the cloud service server 131 in the embodiment will be explained with reference to FIG. 7. FIG. 7 exemplifies the display of a Web page displayed when the cloud service server 131 is accessed from a Web browser running on the terminal 102 such as a PC. Assume that the cloud service server 131 manages information about a business talk in progress for the purpose of sales support.

An A company business talk screen 701 displays information about a business talk with A company. A detailed business talk area 702 displays information about a business talk, including a business talk name, a person in charge in the business partner, and the contact address of the business partner. A message display area 703 displays a timeline formed from a message and comments to it. The timeline 703 displays a state in which MFP A registers a message 711 "AA conference minutes have been prepared", and user B sends back a comment 712 "Send to me as PDF" to the message 711.

According to the embodiment, the timeline 703 also displays a state in which MFP A sends back a comment (analysis result comment) 715 indicating the analysis result of an instruction contained in the comment 712. Further, the timeline 703 displays a state in which user B sends back a comment 716 in response to the comment 715. A comment 714 displays a state in which MFP A sends back a processing result comment (completion comment). Similarly, a comment 713 displays a state in which user C sends back a comment.

In a comment input area 704, when the user inputs a comment to a comment input field 721 and presses an add button 722, a comment addition request is transmitted from the Web browser to the cloud service server 131. Upon receiving the request, the cloud service server 131 registers the input comment. When the user accesses the cloud service server 131 via the Web browser, the registered comment is displayed on the Web browser, like the comments 712 and 713.

In a message input area 705, when the user inputs a message to a message input field 731 and presses a create button 732, the Web browser transmits a message creation request to the cloud service server 131. Upon receiving the request, the cloud service server 131 registers the input message. When the user accesses the cloud service server 131 via the Web browser, the created message is displayed on the Web browser, like the message 711.

<Processing Sequence>

Figure 8:
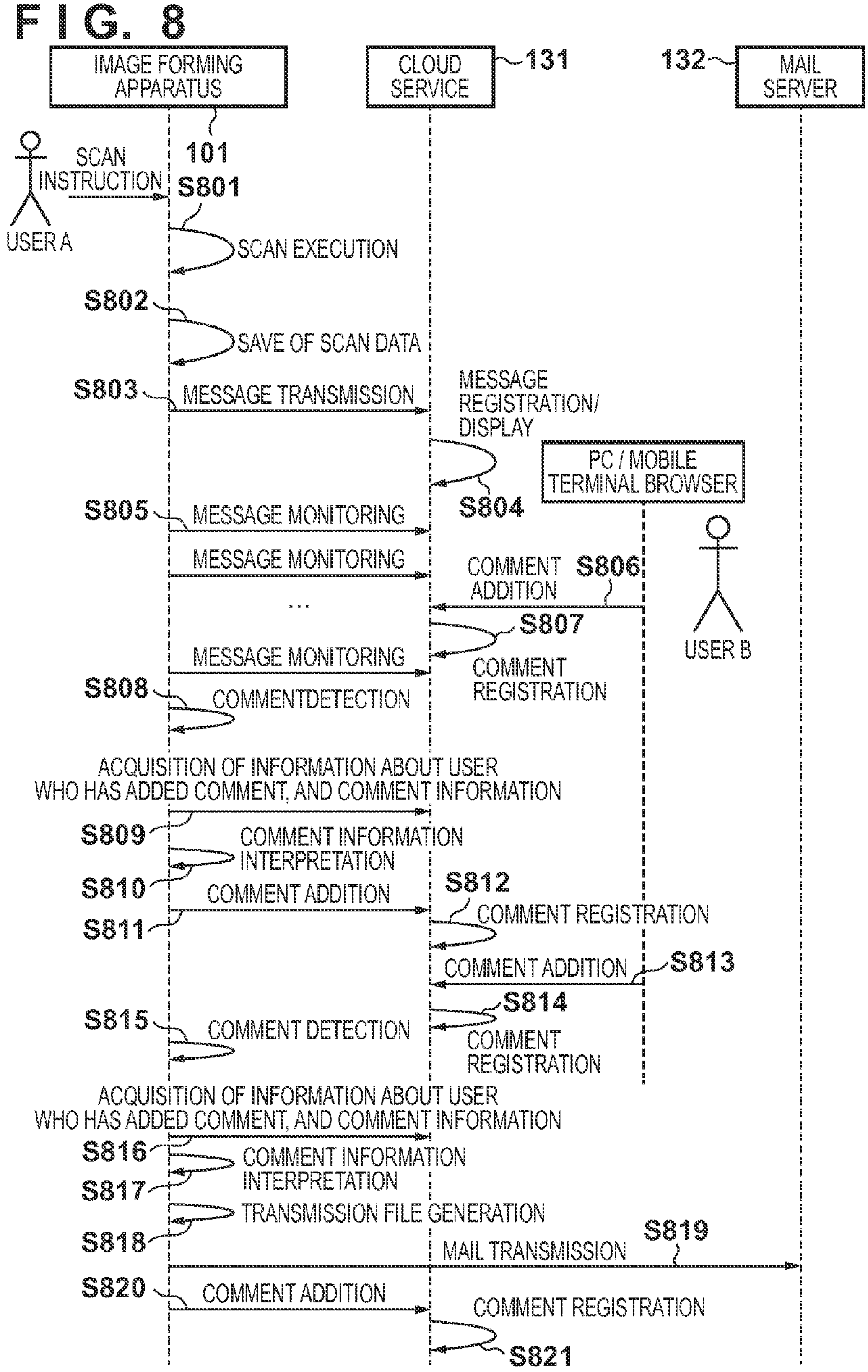
FIG. 8 is a sequence chart for explaining an operation of executing a series of processes according to the embodiment.

A processing sequence when the image forming apparatus 101, cloud service server 131, and mail server 132 in the embodiment execute the processes of comment monitoring and transmission instruction functions and the like will be explained with reference to FIG. 8. Note that detailed processing in the image forming apparatus 101 will be described later with reference to FIGS. 9 to 13.

Upon accepting a scan instruction from the user, the image forming apparatus 101 executes scan processing in step S801. In the scan processing, the scanner 221 scans an image on a paper original, acquiring the resultant image data. In step S802, the image forming apparatus 101 saves the acquired image data as scan data in the scan data DB 405 within the image forming apparatus 101. In step S803, the image forming apparatus 101 transmits a message such as "scan document has been prepared" to the cloud service server 131. In step S804, upon receiving the message transmitted from the image forming apparatus 101, the cloud service server 131 registers it in the message DB 502.

After that, the image forming apparatus 101 itself monitors whether or not a comment has been added to the message registered by the image forming apparatus 101 in the cloud service server 131. In step S805, the image forming apparatus 101 transmits a request and confirms the presence/absence of an additional comment in the cloud service server 131. The image forming apparatus 101 periodically executes the confirmation (message monitoring) of the presence/absence of an additional comment to the cloud service server 131.

In step S806, assume that user B accesses the cloud service server 131 by using the Web browser of the terminal 102 such as a PC or mobile terminal, and confirms the message registered in step S803 by the image forming apparatus 101. When user B wants to acquire scan data, he inputs, to the comment input area 704 shown in FIG. 7, a data format he wants to acquire, and a cloud storage service at the data transmission destination. For example, user B inputs a comment "Send to me as PDF". This comment indicates an instruction to transmit scan data as a file of the PDF format to user B, that is, the terminal 102. After inputting the comment, user B presses the add button 722. Then, the comment addition request is transmitted from the Web browser to the cloud service server 131.

In step S807, upon receiving the comment addition request transmitted from the Web browser of the terminal 102 of user B, the cloud service server 131 registers the comment contents in the message DB 502. Then, in step S808, the image forming apparatus 101 detects the presence of the additional comment by periodic message monitoring described in step S805. In step S809, the image forming apparatus 101 acquires, from the cloud service server 131, the detected comment information "Send to me as PDF", and information (for example, user identification information such as an e-mail address) about the user who has added the comment.

In step S810, the image forming apparatus 101 converts the acquired comment information described in a natural language into a control language interpretable by the image forming apparatus 101. In step S811, the image forming apparatus 101 generates a comment (confirmation result comment) for confirming whether or not the result of analyzing the comment in step S810 matches the request contents user B intends. Further, the image forming apparatus 101 adds the generated comment to the cloud service server 131 as a response to the comment acquired in step S809. For example, a comment "Please confirm your request below. Process: Send this document as e-mail attachment. File Type: PDF. Destination: UserB<Userb@aaa.com>" is added. This indicates an analysis result "the target data is converted into a PDF file format, attached to e-mail, and transmitted to the mail address of user B".

In step S812, the cloud service server 131 registers the comment received from the image forming apparatus 101 in the message DB 502. In step S813, user B confirms the contents of the comment registered in step S812, and if the comment contents match the processing contents he intends, adds a comment indicative of this. For example, a comment such as "OK" or "I like it" is added. In step S814, the cloud service server 131 registers, in the message DB 502, the comment contents for which the comment addition request transmitted from the Web browser in the terminal 102 of user B has been received.

In step S815, the image forming apparatus 101 detects the presence of the additional comment by periodic message monitoring described in step S805. In step S816, the image forming apparatus 101 acquires, from the cloud service server 131, the added comment information and the information about the user who has added the comment. In step S817, the image forming apparatus 101 interprets the comment information acquired in step S816. If the comment interpretation result in step S817 has contents indicating "OK" and the user information acquired in step S816 indicates the user who has added the comment in step S806, the process advances to step S818.

In step S818, the image forming apparatus 101 converts scan data into a PDF file in accordance with the comment analysis result in step S811. In step S819, the image forming apparatus 101 transmits, to the mail server 132, e-mail which has the generated PDF file as an attachment file and is addressed to user B. In step S820, the image forming apparatus 101 adds a processing completion notification as a comment to the cloud service server 131. For example, a comment "processing has been executed" is added. In step S821, upon receiving the comment addition request in step S820, the cloud service server 131 registers the comment contents in the message DB 502.

<Image Reading & Message Transmission Processing>

Next, processing procedures from an image reading operation up to message transmission and comment monitoring in the image forming apparatus 101 in the embodiment of the present invention will be explained with reference to FIG. 9. The following processing is implemented when the CPU 211 reads out a control program stored in the ROM 212 to the RAM 213 and executes it.

In step S901, the screen display unit 400 detects a scan execution instruction issued by a user operation. At this time, a setting for reading an original, and the setting of the document name of read electronic data can be made. As the setting for reading an original, the resolution, color mode, double-sided reading, and the like can be set.

In step S902, upon detecting the scan execution instruction, the screen display unit 400 notifies the job processing unit 404 of the scan job execution instruction. In accordance with the scan job execution instruction, the job processing unit 404 requests the control unit 210 to execute scan processing. In response to the scan processing execution request, the control unit 210 controls the scanner 221 via the scanner I/F 217 to execute scanning. In response to the request from the control unit 210, the scanner 221 reads an image on an original to generate image data, and transmits the image data to the control unit 210 via the scanner I/F 217. Upon receiving the image data, the control unit 210 transmits the received image data as a scan processing execution result to the job processing unit 404. As a result, the execution of scanning ends.

In step S903, the job processing unit 404 notifies the scan data management unit 403 to store the received image data as scan data. Upon receiving the notification from the job processing unit 404, the scan data management unit 403 stores the image data as scan data in the scan data DB 405, and notifies the job processing unit 404 that the storage of the scan data is completed. At the same time as the storage of the scan data, scan data information is stored in a scan data management table 1200 shown in FIG. 12.

An ID which does not overlap any ID in the scan data management table 1200 is generated and stored in a scan document ID 1201. The character string of the document name set in step S901 is stored in a scan document name 1202. The scan data has an internal format in the image forming apparatus 101 and is held in a data format formed by a compression method premised on printing. A message acquired from the cloud service server 131 in step S904 to be described below is registered in a message ID.

Referring back to the description of FIG. 9, in step S904, upon receiving the scan data storage completion notification, the job processing unit 404 requests the microblogging communication management unit 402 to transmit a message. Upon receiving the request from the job processing unit 404, the microblogging communication management unit 402 creates a message containing contents "AA conference minutes have been prepared", and transmits the message to the communication unit 401 together with a message transmission request. As the message, information which allows the user to determine the scanned document, for example, information such as the document name is transmitted. Upon receiving the message transmission request from the microblogging communication management unit 402, the communication unit 401 transmits the received message to the cloud service server 131. By transmitting the message to the cloud service server 131, the message is registered in the microblogging function provided by the cloud service server 131. The communication unit 401 sends back, to the microblogging communication management unit 402, message registration completion result information received from the cloud service server 131. The microblogging communication management unit 402 notifies the scan data management unit 403 of a message ID acquired from the message registration completion result information. The scan data management unit 403 stores the acquired message ID in a message ID 1203 in correspondence with the scan data information registered in step S903.

Accordingly, the microblogging function provided by the cloud service server 131 creates "timeline" for the message. When the user accesses the cloud service server 131 by using the Web browser or the like, a message as shown in FIG. 7 is displayed, and he can communicate with other users by exchanging messages and comments. In step S905, the image forming apparatus 101 monitors the "timeline" of the registered message. The monitoring method will be described later with reference to FIG. 10.

In step S906, the scan data management unit 403 checks whether or not the scan data has been deleted in accordance with an instruction from the user. If the scan data has been deleted, the scan data management unit 403 notifies the microblogging communication management unit 402 of the deletion, and the process advances to step S907. If the scan data has not been deleted, the process returns to step S905, and the timeline monitoring processing continues.

In step S907, upon receiving a request from the scan data management unit 403, the microblogging communication management unit 402 creates a message containing contents "AA conference minutes have been deleted", and transmits a message transmission request and the message to the communication unit 401. Upon receiving the message transmission request from the microblogging communication management unit 402, the communication unit 401 transmits the received message to the cloud service server 131. By transmitting the message to the cloud service server 131, the message is registered in the microblogging function provided by the cloud service server 131. From this, when the user accesses the cloud service server 131 by using the Web browser or the like, he can recognize that the document has already been deleted and cannot be acquired.

<Timeline Monitoring Processing>

Figure 10:
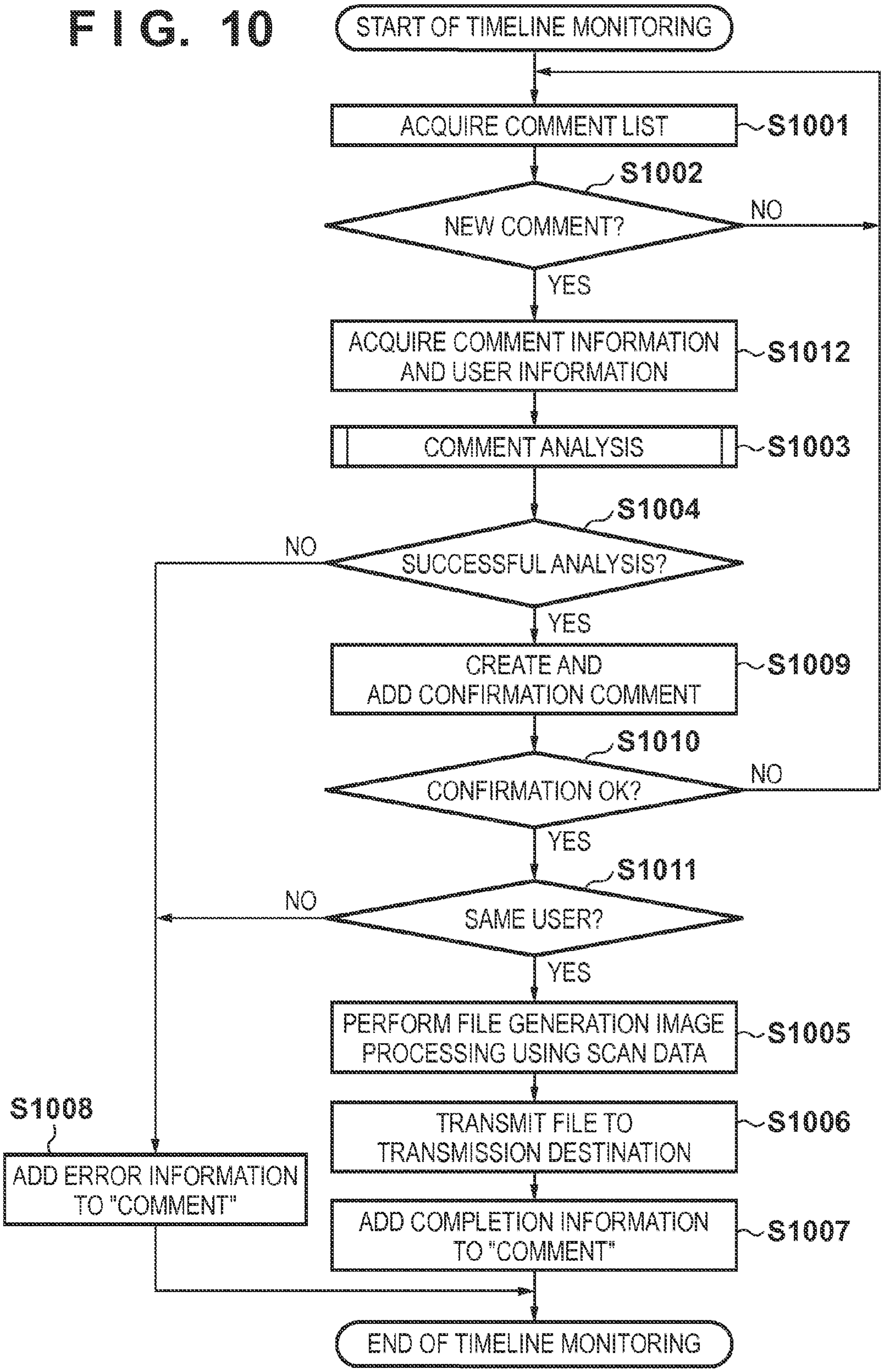
FIG. 10 is a flowchart for explaining details of timeline monitoring processing by the image forming apparatus 101 according to the embodiment.

Details of the timeline monitoring processing (step S905) by the image forming apparatus 101 in the embodiment will be explained with reference to FIG. 10. The following processing is implemented when the CPU 211 reads out a control program stored in the ROM 212 to the RAM 213 and executes it.

In step S1001, the microblogging communication management unit 402 acquires, from the cloud service server 131 via the communication unit 401, comment list information of the message registered in step S904. In step S1002, the CPU 211 determines whether or not a new comment to the message has been added. If there is a new comment, the process advances to step S1003. If there is no new comment, the process returns to step S1001, and the microblogging communication management unit 402 periodically confirms whether or not a new comment has been added. Whether or not there is a new comment is determined by determining whether or not the user of a subcomment to each comment is a user set in the image forming apparatus 101. For example, in FIG. 7, the comments 712 and 713 can be acquired as a list from the comment list for the message 711. By acquiring the comment 712, the comment 716 can be acquired. User information of the comment 716 indicates the user (user B) of the image forming apparatus 101. In step S1002, it can therefore be determined that the comment 716 is not a new comment. In contrast, there is no comment for the comment 713, so it can be determined that the comment 713 is a new comment. Processing of transmitting a comment by the image forming apparatus 101, like the comments 714 and 715, will be described later.

In step S1012, the microblogging communication management unit 402 acquires comment information and user information of the new comment confirmed in step S1002. Then, in step S1003, the microblogging communication management unit 402 uses the language analysis unit 407 to analyze the new comment acquired in step S1012 and convert a sender instruction issued by the comment written in a natural language into a control language processible by the image forming apparatus 101.

In step S1004, the CPU 211 determines whether or not the analysis processing in step S1003 has succeeded. If the analysis processing has succeeded, the process advances to step S1009; if it has failed, to step S1008. In step S1009, the microblogging communication management unit 402 creates a comment (confirmation result comment) indicating to confirm the processing contents, like the comment 715, and transmits it via the communication unit 401 as a response to the comment acquired in step S1012. From this, the user confirms whether or not the analysis result in step S1004 matches the processing contents he intends.

In step S1010, the CPU 211 determines whether or not the user response to the confirmation of the processing contents in step S1009 is positive (OK) or negative (NG). If the confirmation is OK, like the comment 716, the process advances to step S1011. If the contents of the confirmation comment in step S1009 do not match the processing contents the user intends, and the confirmation is NG, the process returns to step S1001. If the confirmation is NG, a comment may be newly created as a method of designating again the processing contents the user intends. Alternatively, the message may be edited to have the intended contents, and a comment may be added as a response to the confirmation comment in step S1009.

In step S1011, the CPU 211 acquires information of the user who has added the OK or NG comment in the confirmation of step S1010, compares this user information with the user information acquired in step S1012, and determines whether or not these users are identical. If these users are identical, the process advances to step S1005; if they are different, to step S1008.

In step S1005, the CPU 211 issues a file format conversion instruction to the image processing unit 406. The file format to be converted is determined based on the comment analysis processing result in step S1003. The image processing unit 406 acquires, via the scan data management unit 403, scan data stored in step S903, and converts its file format. In this case, scan data is specified by searching the scan data information management table for scan data corresponding to the message ID stored in step S903.

In step S1006, the CPU 211 instructs the communication unit 401 to transmit the electronic file generated in step S1005. The transmission destination is determined in accordance with the comment analysis result in step S1003. The communication unit 401 acquires the electronic file from the image processing unit 406, and transmits the electronic file-attached mail to the mail server 132. As a result, the electronic file having undergone image processing can be transmitted to the user who has transmitted the comment. In addition to the mail transmission, the file can also be transmitted to the file sharing function provided by the cloud service server 131 in accordance with the comment analysis result in step S1003.

In step S1007, upon completion of the transmission in step S1006, the microblogging communication management unit 402 creates a completion comment "sent", and transmits it via the communication unit 401. The user who has transmitted the comment can be notified of the completion of the processing via the cloud service server 131. In the example of FIG. 7, the comment 714 is the comment transmitted in this step. At the same time, by acquiring the presence/absence of the comment added in this step, the CPU 211 can determine, in step S1002, whether or not a comment has been added.

In step S1008, since the analysis processing has failed in step S1003, the microblogging communication management unit 402 creates a message "transmission has failed", and transmits it via the communication unit 401. The user who has transmitted the comment can be notified that the processing has failed. At the same time, by acquiring the presence/absence of the comment added in this step, the CPU 211 can determine, in step S1002, whether o not a comment has been added. The user can also add a comment to the timeline for a purpose other than control of the image forming apparatus 101.

<Comment Analysis Processing>

Figure 11:
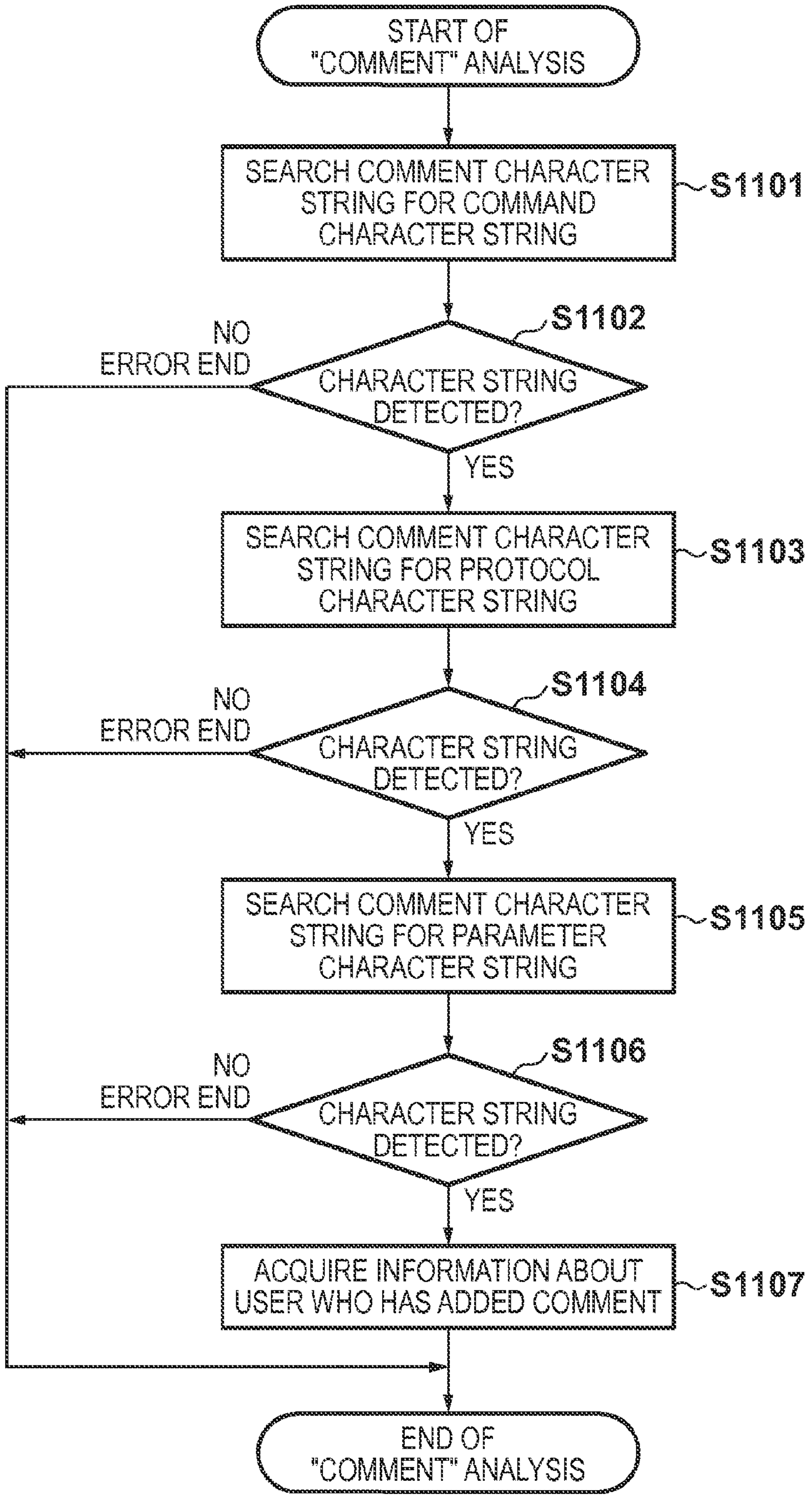
FIG. 11 is a flowchart for explaining details of comment analysis processing by the image forming apparatus 101 according to the embodiment.

Details of the comment analysis processing (step S1003) by the image forming apparatus 101 in the embodiment will be described with reference to FIG. 11. The following processing is implemented when the CPU 211 reads out a control program stored in the ROM 212 to the RAM 213 and executes it. In this flowchart, a new comment detected in step S1002 is analyzed. The comment is described in a format such as "Send to me as PDF". By using the language analysis unit 407, the microblogging communication management unit 402 specifies, from this comment, the mail server 132 serving as an image data transmission destination, a user of the mail server 132 with whom transmitted image data is shared, and the data format of image data to be transmitted.

In step S1101, the language analysis unit 407 searches the comment character string for a command character string 1301 of a command character string management table 1300 shown in FIG. 13. A processing function 1302 is control information indicating processing which corresponds to the command character string 1301 and is to be performed by the image forming apparatus 101. That is, the command character string management table 1300 defines the command character string 1301 and corresponding processing function 1302 by linking them to each other.

In step S1102, the language analysis unit 407 determines whether or not the command character string has been detected as a result of step S1101. If the command character string has been detected in step S1101, the process advances to step S1103; if no command character string has been detected, the comment cannot be processed, and the process ends as an error. For the comment in this example, "Send" is detected, so it can be determined that the processing function is the transmission function.

In step S1103, the language analysis unit 407 searches the comment character string for a protocol character string 1311 of a protocol character string management table 1310 shown in FIG. 13. A processing function 1312 is control information indicating processing which corresponds to the protocol character string 1311 and is to be performed by the image forming apparatus 101. That is, the protocol character string management table 1310 defines the protocol character string 1311 and corresponding processing function 1312 by linking them to each other.

In step S1104, the language analysis unit 407 determines whether or not the protocol character string has been detected as a result of step S1103. If the protocol character string has been detected in step S1103, the process advances to step S1105; if no protocol character string has been detected in step S1103, the comment cannot be processed, and the process ends as an error. For the comment in this example, "me" is detected, so it can be determined that the processing function is the mail transmission function.

In step S1105, the language analysis unit 407 searches the comment character string for a parameter character string 1321 of a parameter character string management table 1320 shown in FIG. 13. A processing function 1322 is control information indicating processing which corresponds to the parameter character string 1321 and is to be performed by the image forming apparatus 101. That is, the parameter character string management table 1320 defines the parameter character string 1321 and corresponding processing function 1322 by linking them to each other.

In step S1106, the language analysis unit 407 determines whether or not the parameter character string has been detected as a result of step S1105. If the character string has been detected in step S1105, the process advances to step S1107; if no character string has been detected in step S1105, the comment cannot be processed, and the process ends as an error. For the comment in this example, "PDF" is detected, so it can be determined that the processing function is the PDF conversion function.

If all character strings have been detected, the microblog communication management unit 402 acquires, in step S1107, transmission destination information for the processing function detected in step S1103. The microblogging communication management unit 402 transmits a comment ID to the cloud service server 131, acquiring user information of the comment sender. The user information in the microblogging function contains information serving as the attribute of the user. For example, the user information contains a photograph of the user's face, name, contact address (for example, telephone number, mail address, and address), organization to which he belongs, and language. By using these kinds of information, a communication partner in the microblogging function can be determined. The microblogging function also has a function of grouping a plurality of users having a common attribute, and changing the type of functions and information to be provided. The mail address contained in the user information is acquired as the transmission destination, and then the process ends. Specifying the transmission destination information from the user information can simplify the mail address input operation.

As described above, when the user issues a processing instruction in a natural language by using the microblogging function, the image forming apparatus according to the embodiment can prompt him to confirm whether or not the result of analyzing the natural language matches the processing instruction contents he intends. This can prevent a complicated processing instruction and rework in large-volume processing.

Note that the embodiment has explained a case in which the user issues a processing instruction "convert into a PDF file and transmit it as a mail attachment" in a natural language to the image forming apparatus by using the microblogging function. However, the present invention is not limited to this, and is applicable when the user issues a processing instruction regarding printing as another function of the image forming apparatus. For example, when user B issues a processing instruction such as "10 copies by full-color booklet printing" or "5 copies by 2in1 double-sided monochrome printing with stapling" in the comment addition of step S806, the language analysis unit 407 similarly converts the processing instruction into a control language processible by the image forming apparatus 101. After that, the processing content confirmation process is executed in step S811, and the same effects as those in the above-described embodiment can be obtained.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-035468 filed on Feb. 21, 2012, which is hereby incorporated by reference herein in its entirety.

What is claimed is:

1. An image forming apparatus capable of communicating with a Web server having a microblogging function, comprising:

a registration unit configured to register a message using the microblogging function in the Web server;

a monitoring unit configured to monitor a comment to the message registered by said registration unit;

an acquisition unit configured to, when said monitoring unit confirms the comment to the registered message, acquire, from the Web server, the comment and user information about a user who has transmitted the comment;

an analysis unit configured to analyze the comment acquired by said acquisition unit, and convert the comment into control information for executing processing by the image forming apparatus;

a generation unit configured to generate an analysis result comment indicating the control information converted by said analysis unit, the analysis result comment prompting the user corresponding to the user information acquired by said acquisition unit to confirm whether or not an analysis result by said analysis unit is correct;

a determination unit configured to register, as a response to the acquired comment in the Web server by using said registration unit, the analysis result comment generated by said generation unit, and determine whether or not a comment of the user to the registered analysis result comment is affirmative; and a processing unit configured to, when said determination unit determines that the comment to the analysis result comment is negative, execute no processing in accordance with the control information, and when said determination unit determines that the comment to the analysis result comment is affirmative, execute processing in accordance with the control information.

2. The apparatus according to claim 1, wherein said monitoring unit monitors a comment to the registered message by periodically inquiring, of the Web server, whether or not a comment to the message registered by said registration unit has been registered.

3. The apparatus according to claim 1, further comprising a storage unit configured to store a table which defines a predetermined character string and the control information by linking the predetermined character string and the control information to each other, wherein said analysis unit searches the comment acquired by said acquisition unit for the predetermined character string, and converts a detected character string into corresponding control information by using the table.

4. The apparatus according to claim 3, wherein the comment acquired by said acquisition unit contains, as the predetermined character string, a command character string indicating processing to be executed.

5. The apparatus according to claim 4, wherein when the command character string contained in the comment acquired by said acquisition unit indicates a function of transmitting outside image data generated by reading an original by the image forming apparatus, the comment acquired by said acquisition unit contains, as the predetermined character string, a protocol character string indicating a transmission method of transmitting the image data, and a parameter character string indicating a format of the image data to be transmitted.

6. The apparatus according to claim 1, wherein upon completion of the processing by said processing unit, said registration unit registers, in the Web server, a completion comment indicating that the processing is completed.

7. The apparatus according to claim 1, wherein when a comment for a comment to the registered message does not exist, said acquisition unit acquires the comment to the registered message as a new comment.

8. The apparatus according to claim 1, wherein the comment to the registered message is described in a natural language.

9. A method for controlling an image forming apparatus capable of communicating with a Web server having a microblogging function, comprising:

causing a registration unit to register a message using the microblogging function in the Web server;

causing a monitoring unit to monitor a comment to the message registered in the causing the registration unit to register a message;

causing an acquisition unit to, when the comment to the registered message is confirmed in the causing the monitoring unit to monitor a comment, acquire, from the Web server, the comment and user information about a user who has transmitted the comment;

causing an analysis unit to analyze the comment acquired in the causing the acquisition unit to acquire the comment and user information, and convert the comment into control information for executing processing by the image forming apparatus;

causing a generation unit to generate an analysis result comment indicating the control information converted in the causing the analysis unit to analyze the comment, the analysis result comment prompting the user corresponding to the user information acquired in the causing the acquisition unit to acquire the comment and user information, to confirm whether or not an analysis result in the causing the analysis unit to analyze the comment is correct;

causing a determination unit to register, as a response to the acquired comment in the Web server in the causing the registration unit to register a message, the analysis result comment generated in the causing the generation unit to generate an analysis result comment, and determine whether or not a comment of the user to the registered analysis result comment is affirmative; and causing a processing unit to, when the comment to the analysis result comment is determined to be negative in the causing the determination unit to register the analysis result comment, execute no processing in accordance with the control information, and when the comment to the analysis result comment is determined to be affirmative in the causing the determination unit to register the analysis result comment, execute processing in accordance with the control information.

10. A non-transitory computer-readable storage medium storing a computer program for causing a computer to execute each step of an image forming apparatus control method defined in claim 9.

* * * * *